(12) United States Patent
Hsieh (10) Patent No.: US 8,487,897 B1
(45) Date of Patent: Jul. 16, 2013

(54) MULTI-DIRECTIONAL CALIBRATION OF TOUCH SCREENS

(75) Inventor: Chih-Hung Hsieh, Saratoga, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/611,960

(22) Filed: Sep. 12, 2012

(51) Int. Cl.
*G06F 3/041* (2006.01)

(52) U.S. Cl.
USPC ............ 345/173; 345/168; 715/773; 715/863

(58) Field of Classification Search
USPC .......... 345/153, 168, 169, 173–178; 715/776, 715/863, 864; 178/18.01, 18.03–18.07, 178, 178/19.01–19.05; 341/20–23
See application file for complete search history.

(56) References Cited

U.S. PATENT DOCUMENTS

| | | | |
|---|---|---|---|
| 7,508,324 B2 | 3/2009 | Suraqui | |
| 7,844,914 B2 | 11/2010 | Andre et al. | |
| 7,886,233 B2 | 2/2011 | Rainisto et al. | |
| 7,900,156 B2 | 3/2011 | Andre et al. | |
| 2004/0140956 A1* | 7/2004 | Kushler et al. | 345/168 |
| 2006/0007162 A1* | 1/2006 | Kato | 345/168 |
| 2006/0053387 A1 | 3/2006 | Ording | |
| 2009/0251438 A1 | 10/2009 | Westerman et al. | |
| 2010/0188371 A1 | 7/2010 | Lowles et al. | |
| 2010/0220064 A1 | 9/2010 | Griffin et al. | |
| 2010/0289752 A1 | 11/2010 | Birkler | |
| 2010/0302212 A1 | 12/2010 | Weber et al. | |
| 2010/0315266 A1* | 12/2010 | Gunawardana et al. | 341/22 |
| 2011/0007034 A1 | 1/2011 | Jorgensen | |

* cited by examiner

*Primary Examiner* — Koosha Sharifi-Tafreshi
(74) *Attorney, Agent, or Firm* — Troutman Sanders LLP; James E. Schutz; Mark Lehi Jones (57) ABSTRACT

Devices and methods for interpreting an input key from a keystroke are disclosed. In an implementation, the method includes displaying a keyboard including keys. The method also includes defining targets on the keyboard. Each one of the targets is associated with one of the keys, an area of the keyboard, and a swipe direction. Each one of the keys is associated with at least two of the targets. The method also includes determining a location and a swipe direction of the keystroke, and comparing the location of the keystroke with the areas associated with at least some of the targets. The method also includes comparing the swipe direction of the keystroke with the swipe directions associated with at least some of the targets, and defining the input key based on the comparisons of the location of the keystroke and the swipe direction of the keystroke with the targets.

20 Claims, 7 Drawing Sheets

MULTI-DIRECTIONAL CALIBRATION OF TOUCH SCREENS

TECHNICAL FIELD

The present disclosure relates to methods for accurately interpreting input into a computing device, such as keystrokes on a keyboard.

BACKGROUND

Computing devices configured to interact with a human user often include peripheral components enabling the computing device to receive input from the user and display or otherwise produce output. One common example of an input peripheral is a keyboard, and one common example of an output peripheral is a display screen. Typically, a user strikes the keys of the keyboard, resulting in the symbols associated with the keys struck being displayed on the screen. Traditional keyboards generally provide a raised, depressible profile for the keys, which tends to catch a keystroke and provide a tactile response to the user, such that the user can feel, as well as see on the screen, the result of the keystroke.

In some computing devices, e.g., mobile computing devices such as cellular phones, it can be advantageous to combine the functionality of the screen with the keyboard. The screen can thus display a "virtual keyboard" (also referred to as a "soft keyboard") at all times or merely when user input is desired. The virtual keyboard can occupy a touch-sensitive region of the screen and can be partitioned by visual representations of the keys. The virtual keyboard can be configured to associate a keystroke landing in one of the key areas with the associated key. This combined functionality of the display screen, serving as both an input and an output peripheral, can reduce the size of the device, without requiring further reductions in the size of the keyboard.

However, with mobile devices being relatively small, the keyboard area can be significantly smaller than a traditional keyboard. Further, even small conventional keyboards can provide tactile feedback, while virtual keyboards may not. Accordingly, the potential for typing errors can be greater on some virtual keyboards over similarly-sized convention keyboards, especially when a user types rapidly. For example, since the virtual keyboard can be relatively small, the key or intended strike area can be smaller than the user's finger, such that the finger obscures the user's view of the strike area. Further, the lack of tactile feedback or a raised button can limit a user's ability to feel a difference between the areas associated with two adjacent keys. These factors can combine into an increase in the frequency at which a user misses the intended strike area, resulting in an ambiguous or erroneous keystroke.

Furthermore, the lack of tactile feedback can also result in a user's finger undergoing a lateral "swiping" movement across the virtual keyboard as part of the keystroke, despite a single point keystroke being intended and/or perceived by the user. This can frequently be experienced in cases where the typist is using two (or more) fingers (e.g., both thumbs) to input keystrokes. Such swiping, however, can lead to keystrokes that are partially in and partially out of an area associated with a key, miss the key area entirely, or even are partially in two areas associated with two different keys. This can further lead to an increase in the frequency of ambiguous and/or erroneously interpreted keystrokes.

However, virtual keyboards offer several advantages over conventional keyboards, including increased display screen size, and thus several solutions to such accuracy challenges have been proposed and implemented. For example, some designers have determined what the "true middle" of a finger strike can be, based on probability, usage history, and human perception and targeting of fingers. Further, some designs employ methods of adjusting the target area on the keyboard associated with a key, without adjusting the displayed key area, so as to capture the area the user tends to strike when inputting a certain key. Moreover, a variety of heuristics and other processes have been developed for making a decision between two keys for an ambiguous keystroke (i.e., "disambiguation"). Such processes can be contextual, with respect to the text being entered, or based on historical usage.

However, such processes generally do not consider the lateral swipe in the keystroke, and can still lead to ambiguous or erroneously interpreted keystrokes. Such processes also often fail to consider that, for any given key, a user can tend to strike several different regions, with differing swipe patterns, depending, for example, on the hand or even the particular finger being used to make the keystroke. This can result in the historical, usage-based schemes being inaccurate, or at least incomplete.

What is needed, then, are improved devices and methods for selecting keys based on keystrokes on a virtual keyboard.

SUMMARY

Implementations of the present disclosure may provide a method for selecting an input key from a keystroke. The method includes displaying a keyboard having keys, and defining targets on the keyboard. Each one of the targets is associated with one of the keys, an area of the keyboard, and a swipe direction. Each one of the keys is associated with at least two of the targets. The method further includes determining a location and a swipe direction of the keystroke relative to the keyboard. The method also includes comparing the location of the keystroke with the areas associated with at least some of the targets, and comparing the swipe direction of the keystroke with the swipe directions associated with at least some of the targets. The method also includes defining the input key based on the comparisons of the location of the keystroke and the swipe direction of the keystroke with the targets.

Implementations of the present disclosure may further provide a computer-implemented method for interpreting keystrokes on a keyboard. The method includes associating targets with keys of keyboard. Each target is associated with one of the keys, and each one of the keys has at least two of the targets associated therewith. The method also includes positioning the targets on the keyboard, such that each target is associated with an area of the keyboard, and associating each of the targets with a swipe direction. The method further includes determining a location of the keystroke and a swipe direction of the keystroke relative the keyboard, and comparing the location of the keystroke and the swipe direction of the keystroke with the areas and the swipe directions associated with at least some of the targets.

Implementations of the disclosure may also provide a computer-readable medium storing instructions that, when executed by one or more processors, cause the one or more processors to perform a sequence of operations. The operations include displaying a keyboard having keys, and defining targets on the keyboard. Each one of the targets is associated with one of the keys, an area of the keyboard, and a swipe direction. Each one of the keys is associated with at least two of the targets. The operations also include determining a location and a swipe direction of the keystroke relative the keyboard. The operations further include comparing the location of the keystroke with the areas associated with at least some of the targets, and comparing the swipe direction of the keystroke with the swipe directions associated with at least some of the targets. The operations additionally include defining the input key based on the comparisons of the location of the keystroke and the swipe direction of the keystroke with the targets.

BRIEF DESCRIPTION OF THE DRAWINGS

The accompanying drawings, which are incorporated in and constitute a part of this specification, illustrate implementations of the present teachings and together with the description, serve to explain the principles of the present teachings. In the figures.

DETAILED DESCRIPTION

The following detailed description refers to the accompanying drawings. Wherever convenient, the same reference numbers are used in the drawings and the following description to refer to the same or similar parts. While several exemplary implementations and features of the present disclosure are described herein, modifications, adaptations, and other implementations are possible, without departing from the spirit and scope of the present disclosure. Accordingly, the following detailed description does not limit the present disclosure. Instead, the proper scope of the disclosure is defined by the appended claims.

Implementations of the present disclosure provide methods and devices configured to interpret a keystroke on a virtual keyboard. For example, the method generally includes interpreting the keystroke using both the swipe direction and the location of the area struck as part of the keystroke. Further, the method can include establishing two or more targets associated with each key of the device, with each target for a particular key being associated with different swipe directions. This can capitalize on patterns of misses/keystroke offsets associated with the user's hands and/or fingers making the keystrokes, allowing minimally-sized, precise targets, which can avoid ambiguous keystrokes.

Accordingly, when a keystroke is registered on the keyboard, the device can capture both location and swipe direction data for the keystroke and compare it to the targets associated with the keys. If one target is located coincident with at least a portion of the keystroke, and the swipe direction associated with the keystroke matches the swipe direction associated with the coincident target, the keystroke can be interpreted as selecting the key associated with the target. By contrast, if two targets are coincident, but only one is associated with a matching swipe direction, the mismatching target can be ignored, which can result in a single target selection and, thus, an unambiguous keystroke interpretation.

On the other hand, if no targets are both coincident with the keystroke and associated with a matching swipe direction, the keystroke can be ambiguous, and the device can determine a most likely key, based on any suitable decision-making process, examples of which are provided below. Once having determined the most likely key, the device can "tune" the targeting scheme to provide consistent interpretation of subsequent, similar keystrokes, thereby removing the ambiguity. Such tuning can proceed by adjusting a location of a target (e.g., by moving or resizing the target) associated with the most likely key and the same swipe direction, but previously not located coincident with the keystroke. By so adjusting the target, the target can become coincident with the keystroke, such that a subsequent, similar keystroke can have an increased likelihood of being coincident with the target. Tuning can also include altering the swipe direction associated with the target being adjusted, so as to match the keystroke swipe direction.

Similarly, if two targets associated with the same swipe direction, but two different keys, are coincident with the keystroke, the keystroke can be ambiguous. The device can determine which of the keys, between the two, is more likely the intended key. The device can make such determination based on one or more variables and/or any suitable decision-making process. After selecting the more likely key between the two keys associated with the two coincident targets, the device can proceed to adjusting the location and/or swipe direction of one or both coincident targets, such that a subsequent, similar keystroke is coincident and matches swipe direction with a single target, so as to avoid ambiguity.

Thus, the device and method can increase typing accuracy, especially if the usage is generally consistent over time. With such consistent usage, the targets can be minimally sized and positioned coincident with the most likely keystrokes, from either hand, regardless of whether the keystroke is within the actual boundary of the key displayed on the touch screen. This can result in consistent interpretation of similar keystrokes, with a minimum amount of ambiguity, thereby increasing the frequency of a correct interpretation of the keystrokes.

Figure 1:
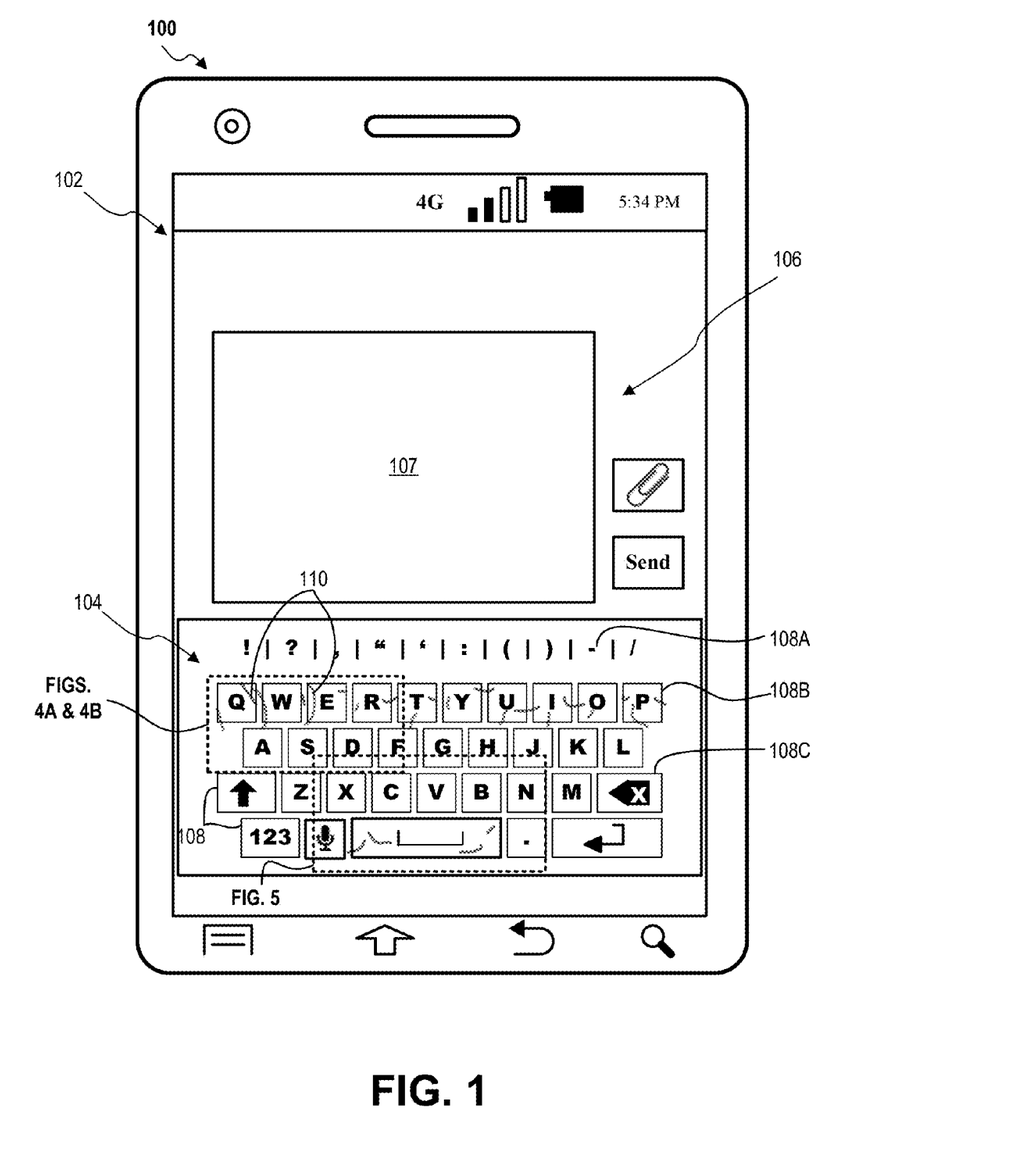
FIG. 1 illustrates a simplified plan view of a mobile device having a touch screen including a keyboard region, according to an implementation.

Turning now to a specific implementation of such devices and methods contemplated, FIG. 1 illustrates a simplified plan view of a device 100, which can be a mobile device, according to an implementation. As the term is used herein, "device" can refer to any type of mobile or standalone device, including any combination of hardware and software, capable of supporting the functionalities and data processing techniques as discussed herein. For example, the device can be a mobile phone, a tablet device, a notebook device, a personal data assistant (PDA), or the like.

The mobile device 100 generally includes a display 102, which can be a touch screen display of any type, such as, for example, an LED, LCD, CRT, plasma, electrostatic imaging, or any other type of display that can be configured to display images and receive input by interaction with a user. Various other types of input-capturing screens can be used for the display 102, e.g., screens cooperating with optical sensors configured to track/register movement of a user, stylus, pointer, etc., without necessarily relying on anything touching the display 102. In some implementations, the display 102 can be a projection onto an external surface, and the user may interact with the projected images to provide input to the mobile device 100. For purposes of illustration, however, a touchscreen display 102 implementation will be described herein, but is not to be considered limiting unless otherwise expressly stated herein.

The display 102 can include a keyboard region 104 and an output region 106. The keyboard region 104 can be part of the same touch screen as the output region 106, but in other implementations, the regions 104, 106 can be provided by separate screens. Further, the output region 106 can display one or more text boxes 107, which can be configured to display text, as well as other types of visual media such as pictures, video, etc.

In the keyboard region 104, the display 102 can be configured to show a keyboard, depicting regions with alphanumerical, punctuation, control, or other types symbols positioned therein, which are referred to herein as keys 108. As shown, the keyboard region 104 can have keys 108 arranged generally in a standard "QWERTY" configuration; however, any other arrangements (alphabetical, Dvorak, stenographic, etc.), in any language, can be employed. Further, each key 108 can define a region of the display 102 associated therewith.

They keys 108 can each define the region associated therewith in any suitable shape. For example, keys 108A can be formed by region enclosed by a square. Other keys 108B can be defined by parallel vertical lines, but open on the top and bottom ends. Still other keys 108C can be non-square, e.g., L-shaped, circular, etc. The keys 108 can each bear the symbol associated therewith, approximately in the middle of the region of the display 102 associated with the key 108.

At least nominally, a keystroke 110 (i.e., a movement of a finger, stylus, pen, pointer, etc.) on the display 102 in the region bounded by the key 108 can be registered and interpreted by the mobile device 100 as selecting the symbol associated with the key 108 as input. Tracked displays of keystrokes 110 for the top row of alphabetical keys 108 are illustrated in FIG. 1; however, it will be appreciated that while in some implementations it can, the keyboard region 104 need not display such tracked keystrokes 110, which are generally illustrated herein to facilitate the description contained in the present disclosure. The keystrokes 110 may be taps, swipes, strokes, any combination thereof, or the like.

As can be appreciated from the generally free-form, linear keystrokes 110 tracked on the keyboard region 104, each keystroke 110 can have a lateral movement or "swipe" element thereto, proceeding across the face of the display 102. Further, as illustrated, the keystrokes 110 may not be contained within a single key 108, but can extend into two or more keys 108 or in between two keys 108, as shown, potentially resulting in an ambiguous keystroke. Moreover, multiple keystrokes 110 can represent attempts to strike the same key 108, but can be found at different locations on the keyboard region 104.

Figure 2:
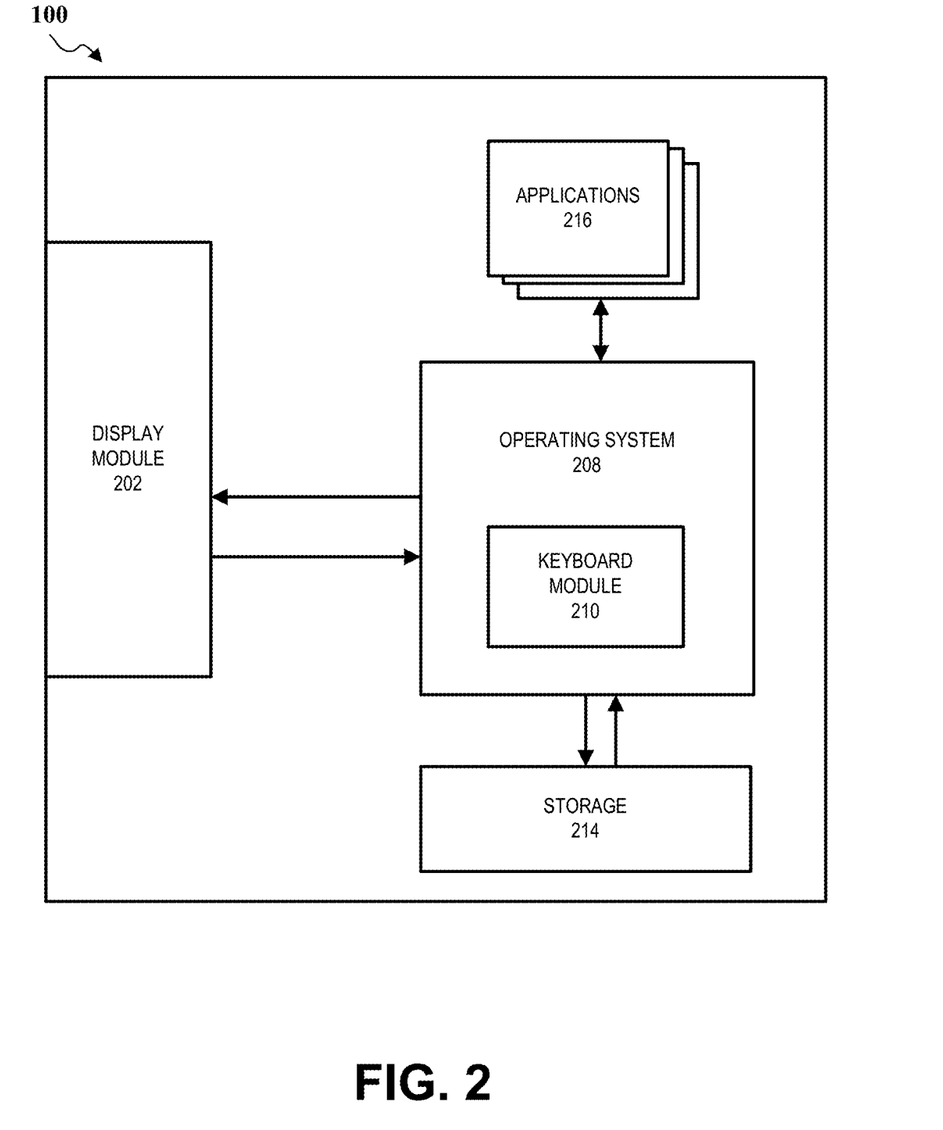
FIG. 2 illustrates a schematic view of components of the mobile device, according to an implementation.

Turning now to the details of the components of the mobile device 100, which can implement, for example, various methods for interpreting keystrokes 110, FIG. 2 illustrates a schematic view of several components of the mobile device 100, according to at least one implementation. With additional reference to FIG. 1, the mobile device 100 can include a display module 202, which may provide the display 102. The display module 202 can be any module configured to cause output, e.g., a keyboard display and/or a text box indicating previously-selected text, to be visually depicted and configured to receive input from a user, e.g., a keystroke 110 indicating a key 108 on a keyboard region 104. The display module 202 can include a touchscreen and associated hardware, a projector and one or more motion sensors, optical sensors, or the like.

The mobile device 100 can also include an operating system 208, which can provide a keyboard module 210. The keyboard module 210 can be configured to receive keyboard data from the display module 202, particularly, data entered by a user via a keystroke 110 on the keyboard region 104 of the display 102. Further, the keyboard module 210 can be configured to display the keys 108 in the keyboard region 104 of the display 102, by sending display data to the display module 202. In some implementations, however, the keyboard region 104 can be permanently displayed on the display 102, such as, for example, via an overlay.

Further, the mobile device 100 can include one or more applications 216, as well as storage 218. The application 216 can receive input from the user via the display 102, as interpreted by the keyboard module 210. The application 216 can employ such input and provide useful output associated therewith, for display via the display module 202. The output from the application 216 can be transferred back to the operating system 208 and thereafter to the display module 202, which can convert such data to images on the display 102. The application 216 can include, for example, a word-processing application, a web-browser, browser-implemented application, or the like.

As noted above, the mobile device 100 can implement one or more methods for interpreting the keystrokes 110, i.e., determining which key 108 the user intends to select by inputting the keystroke 110. Thus, reference is now made to FIG. 3, which illustrates a flowchart of a method 300 for interpreting a keystroke 110, according to an implementation.

Figure 3:
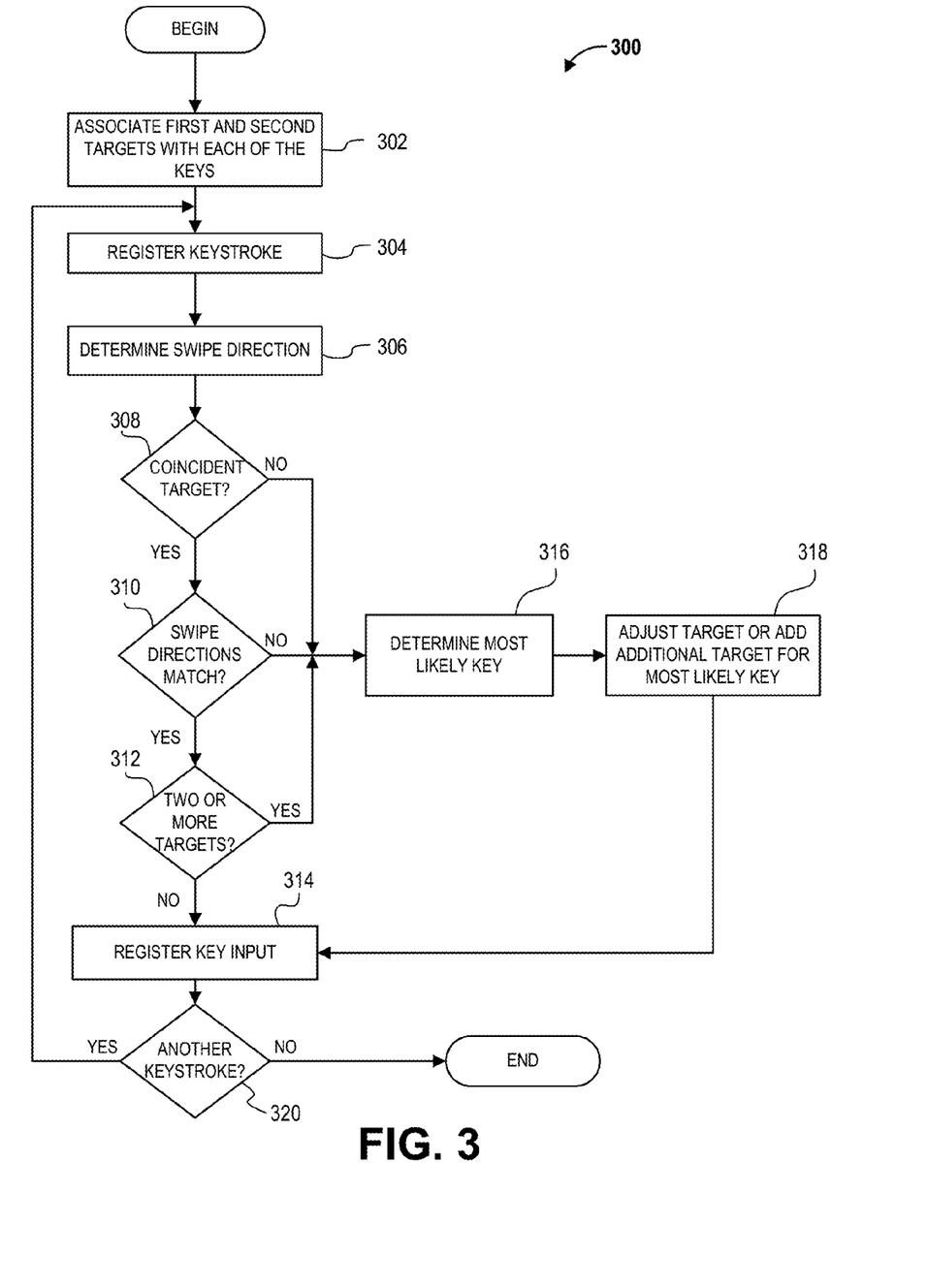
FIG. 3 illustrates a flowchart of a method for selecting an input key from a keystroke, according to an implementation.

With additional reference to FIGS. 1 and 2, the method 300 can begin by the keyboard module 210 and/or the display module 202 of the mobile device 100 associating each of the keys 108 of the keyboard region 104 (FIG. 1) with at least two targets, e.g., first and second targets, as at 302. Further, it will be appreciated that three or more targets can be employed for some or all of the keys 108 and/or a single target can be employed for one or more of the keys 108, without departing from the scope of the present disclosure. For example, for each key 108, the first and second targets associated therewith can refer to (i.e., be associated with) an area of the keyboard region 104 and can be associated with a swipe direction. Each first target can be associated with the same first swipe direction and each second target can be associated with the same second swipe direction, with the first and second swipe directions being different from each other. In some implementations, however, the first and second swipe directions may vary between keys 108, such that the first targets of each of the keys 108 may not all be associated with the same swipe direction, and the same can be the case for the second targets.

Figure 4A:
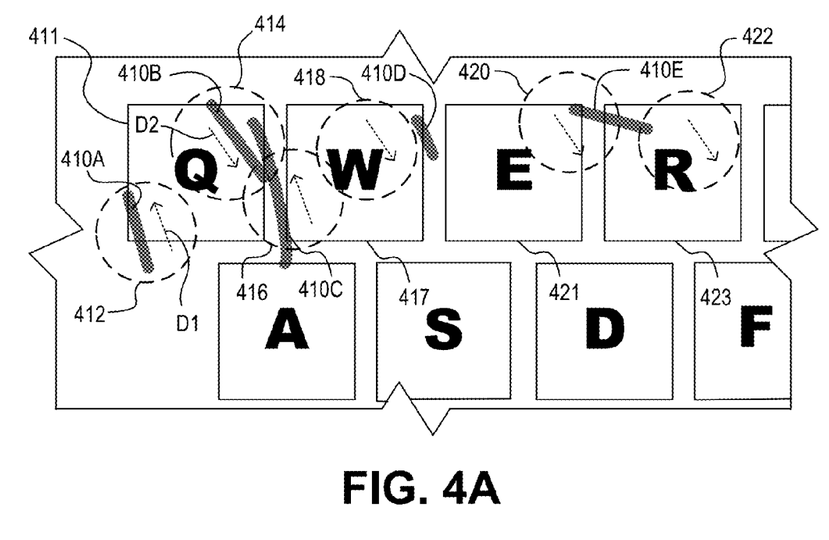
FIGS. 4A and 4B illustrate an enlarged view of a portion of the keyboard region illustrated in FIG. 1, further depicting targets associated with the keys of the keyboard region, according to an implementation.
Figure 4B:
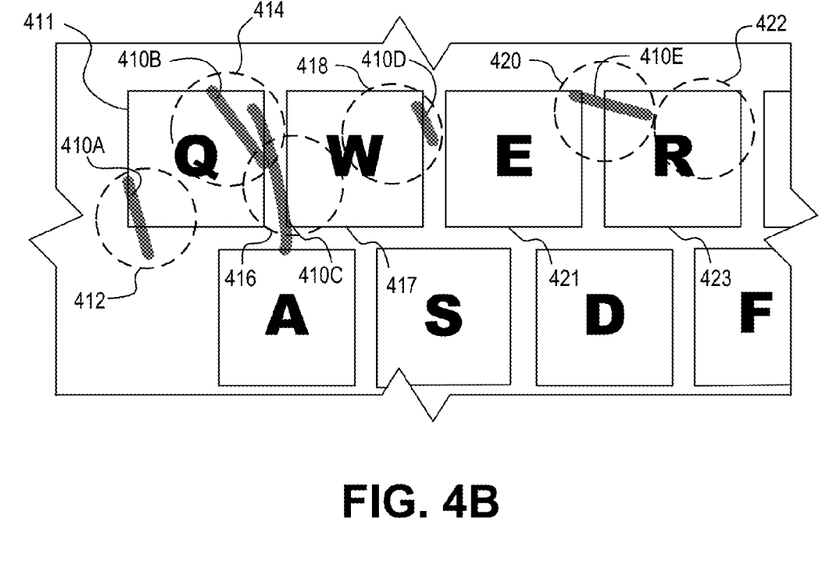

To further illustrate the first and second targets associated with the keys 108, as at 302, additional reference is made to FIGS. 4A and 4B, which illustrate an enlarged partial view of the keyboard region 104, with keystrokes 410A, 410B, 410C, 410D tracked, as shown, for illustrative purposes. Further, FIGS. 4A and 4B illustrate several targets, defined on the keyboard region 104, as dashed circles 412-422. It will be appreciated, however, that while, in some implementations, the targets can be displayed on the keyboard region 104 of the display 102, they need not be and can, instead, be representations of location data employed by the keyboard module 210 to interpret the keystrokes 110 as described herein.

The 'Q' key 411 can provide an instructive example. A first target 412 and a second target 414 can be associated with the 'Q' key 411, according to an implementation. The user can enter keystrokes 410A or 410B, which can be registered by the display module 202. The keystrokes 410A or 410B can represent an intention by the user to select the 'Q' key 411, depending on a variety of factors, for example, which hand is being used for the keystroke 410A, 410B. The first and second targets 412, 414 are positioned, as shown, so as to be at least partially coincident (i.e., associated with an area of the keyboard region 104 in which the keystroke 110 is at least partially found at some point while it is entered) to one of the two keystrokes 410A, 410B, respectively. Further, the first target 412 is associated with a first swipe direction D1, which can be up and left, i.e., the swipe direction of the keystroke 410A. Similarly, the second target 414 can be associated with a second swipe direction D2, which can be down and right, i.e., the swipe direction of the keystroke 410B. It will be appreciated that the particular direction of the swipe with which the first and second targets 412, 414 are associated is but one example among many contemplated herein, and, further, can vary among different users even for a single mobile device 100. Additionally, the swipe directions D1 and D2 may be illustrated and displayed to the user; however, in other embodiments, the illustrated swipe directions D1 and D2 may be representative of information stored by the device 100.

In general, the first and second targets associated with the keys 108, including the first and second targets 412, 414 associated with the 'Q' key 411, can be initially "positioned" at a default location. When describing or otherwise referring to the targets herein, the terms "positioned," "disposed," and "defined" can mean that the target is actually displayed or otherwise associated (e.g., numerically, according to coordinates defined on the display 102, such as by storing a range of coordinates) with the illustrated location.

The default location of the targets can be coincident with the center of the associated key 108, and can be smaller, bigger, or the same size as the region defined by the key 108. In other implementations, the first and second targets can have other default locations. For example, in some cases, an expected offset can be predetermined and applied for keystrokes having different swipe directions. In some implementations, the keystrokes 110 from one hand can consistently, or at least generally, swipe in a certain direction and miss the center of the key 108 by a given offset, while keystrokes 110 from the other hand can consistently, or at least generally, swipe in a different direction and miss the center of the key 108 by a different offset. The first and second targets of one, some, or each of the keys 108 can be initially positioned so as to take such known data into account.

Returning to the example of the 'Q' key 411, the first target 412, associated with an up-and-left swipe direction D1, can be positioned to the left and below the center of the 'Q' key 411. Further, the second target 414, associated with a down-and-right swipe direction D2, can be positioned to the right and above the center of the 'Q' key 411. Such positioning can be a default, or the result of a tuning scheme, as will be described in greater detail below.

Referring again to FIG. 3, with continuing reference to FIGS. 4A and 4B, the method 300 can proceed to waiting for and then registering a keystroke 110 using the display module 202, as at 304. Registering the keystroke 110 at 304 can include the mobile device 100 recognizing that the user is attempting to select a key 108, e.g., by contacting or otherwise indicating to an area of the keyboard region 104. Since the keystroke 110 can be over a period of time, registration can include tracking the keystroke 110, for example, logging the location of the keystroke 110 over time, e.g., until the user ends the keystroke 110 or until a timer expires, or the like.

After or during such registration at 304, the method 300 can proceed to determining a swipe direction of the keystroke 110, as at 306. For example, the keyboard module 210 can compare successive points logged by the display module 202 during registration at 304 to calculate a swipe direction of the keystroke 110. Accordingly, the mobile device 100, e.g., the keyboard module 210, can determine both the location and the swipe direction of the keystroke 110 at 302 and 304. The method 300 can then include the keyboard module 210 of the mobile device 100 determining an input key (i.e., the key 108 determined to be associated with a given keystroke 110) using both the location and swipe direction of the keystroke 110, by comparing the keystroke 110 to the targets associated with the keys 108.

It will be appreciated that the sequence of first determining whether the keystroke 110 is coincident with a target and then determining whether the swipe direction of the keystroke 110 matches the swipe direction associated with the coincident target(s) can be reversed. For example, the method 300 can include the keyboard module 210 first considering the swipe direction of the keystroke 110 and eliminating from consideration all targets associated with mismatching swipe directions. The method 300 can then move to the mobile device 100 determining which of the remaining targets, if any, is coincident with the keystroke 110.

Returning to the example of the 'Q' key 411 shown in FIGS. 4A and 4B, the method 300 can include determining whether any of the targets are coincident with a keystroke 110, as at 308. For example, if the keystroke 410A is entered, the keyboard module 210 of the mobile device 100 can determine that the first target 412 associated with the 'Q' key 411 is coincident therewith.

Such determination can include the operating system 208 accessing a database of targets provided in the storage 214. The database can include each of the targets, along with associated characteristics, e.g., location and swipe direction. Accordingly, to proceed with the method 300, the operating system 208, e.g., the keyboard module 210, can compare the keystrokes 110 registered by the display module 202 with the target information stored in the storage 214.

Continuing with the example of the keystroke 410A, with a coincident target 412 found, the method 300 can proceed to determining whether the swipe directions of the keystroke 410A and the first target 412 match, as at 310. As noted above, the keystroke 410A can proceed, for example, up and left (i.e., direction D1). The first target 412, as also noted above, can be associated with an up-and-left swipe direction D1. Thus, in this example, the condition at 310 is satisfied. The line between two swipe directions "matching" or "mismatching" may be determined according to a variety of factors, for example, consistency of swipe directions or the like. For example, any swipe direction that includes an upward movement may be a match for any upwardly-directed swipes. In other implementations, an up and right swipe direction may be a mismatch for an up-and-left swipe direction. Furthermore, some implementations may consider a percentage of directional matching to determine whether two swipe directions match. For example, a "match" may be determined as two swipe directions having less than about a 10%, 20%, 30%, 40%, 50%, or more, or any range therein, divergence. Moreover, some keystrokes 110 may include two or more swipe directions (i.e., curving from up to left, etc.), which may be determined to be matching with a swipe direction associated with a target according to a variety of factors (e.g., percentage of the swipe associated with the swipe direction, etc.). Accordingly, it will be appreciated that the threshold between matching and mismatching may be set and/or revised a case-by-case basis, preselected according to user information, historical usage, and/or predetermined. Further, these examples are but a few among many contemplated herein for use in determining matching versus mismatching swipe directions.

Still continuing with the example of the keystroke 410A, the method 300 can then proceed to determining whether the keystroke 410A is coincident and matches swipe directions with two or more targets, as at 312, thus resulting in a potentially ambiguous keystroke. Here, it can be appreciated from FIGS. 4A and 4B that the illustrative keystroke 410A is confined to the region defined by the first target 412. Thus, the condition at 312 in this example is not satisfied.

Accordingly, having found a target that is coincident with the keystroke 410A, and associated with a swipe direction that matches the swipe direction of the keystroke 410A, the method 300 can proceed to the keyboard module 210 selecting or otherwise registering the key 108 associated with the target as the input key, as at 314. In the present example, the 'Q' key 411 is associated with the first target 412, which is coincident with the keystroke 410A and is associated with a matching swipe direction. Thus, in this example, the 'Q' key 411 is selected as the input key. The example of the keystroke 410A can represent the best-case scenario, with the keystroke 410A being coincident with a single target and matching the swipe direction associated therewith.

The method 300 can be configured to interpret a single keystroke 110, and can also, in some implementations, be configured to interpret multiple keystrokes 100, for example, iteratively. Accordingly, the method 300 may include waiting for, or otherwise determining, whether additional keystrokes 110 are being and/or are going to be entered, as at 320. Such keystrokes 110 can, for example, be expected as long as a text-entry box, prompt, etc. is displayed on the display 102 and/or unless a command is entered, signaling the end of a sequence of keystrokes (e.g., by clicking a "send" button, in the case of a text message). If no additional keystrokes 110 are expected at 320, the method 300 can end. Otherwise, the method 300 can proceed back to registering the next keystroke 110 at 304.

Returning to the examples illustrated in FIGS. 4A and 4B, keystrokes 410B and 410C can represent departures from the best-case scenario that the method 300 can be configured to determine as a non-ambiguous keystroke. Both keystrokes 410B and 410C can be coincident with two targets: the second target 414 associated with the 'Q' key 411, and as a first target 416 associated with the adjacent 'W' key 417. Despite coincidence with two targets 414, 416, the present method 300 can provide for a non-ambiguous interpretation of the keystrokes 410B and 410C. For example, considering keystroke 410C in greater detail, the method 300 can proceed by the display module 202 registering the keystroke 410C, as at 304, and providing information, such as logged locations thereof to the keyboard module 310. In turn, the keyboard module 210 can determine the swipe direction (up and left direction, i.e., swipe direction D1), as at 306. The mobile device 100, e.g., the keyboard module 210 or another part of the operating system 208, implementing the method 300, can then proceed to determining whether the keystroke 410C is coincident with a target, as at 308. In this instance, the keystroke 410C can be coincident with the first target 416 associated with the 'W' key 417 and the second target 414 associated with the 'Q' key 411, thereby satisfying the condition at 308.

The method 300 can proceed to determining whether the swipe direction of the keystroke 410C matches the swipe direction of the coincident targets 414, 116, as at 310. As previously noted, the second target 414 associated with the 'Q' key 411 can also be associated with the swipe direction D2, down and right. In the illustrated example, the swipe direction D1 (up and left) of the keystroke 410C thus does not match the swipe direction associated with the second target 414 of the 'Q' key 411. Therefore, although the keystroke 410C is coincident with the second target 414 of the 'Q' key 411, the second target 414 can be disregarded for the keystroke 410C, based on mismatching swipe directions. On the other hand, the first target 416 of the 'W' key 417 can be associated with the swipe direction D1, and thus the swipe direction of the keystroke 410C can match the swipe direction associated with the first target 416 of the 'W' key 417. Accordingly, the condition at 310 can be satisfied, with the first target 416 of the 'W' key 417 being at least partially coincident with the keystroke 410C and associated with a swipe direction matching the swipe direction.

Further, since one target, the first target 416 associated with the 'W' key 417, is identified for the keystroke 410C, the condition (i.e., two or more suitable targets identified), at 312 can be unsatisfied. Therefore, the mobile device 100 implementing the method 300 can register the keystroke 410B as selecting the 'W' key 417 for the input key, at 314. The method 300 can proceed through a similar analysis for keystroke 410B, as the down-and-right swipe direction D2 of the keystroke 410B can match the swipe direction associated with the second target 414 of the 'Q' key 411, but mismatch the swipe direction associated with the first target 416 of the 'W' key 417.

Returning to FIG. 4A, keystroke 410D can present another instance of an other-than-best-case scenario, which the method 300 can turn into a tuning advantage. Accordingly, the method 300 can include registering the keystroke 410D, as at 304, and determining the swipe direction D2 thereof, as at 306, which, for the keystroke 410D, can be down and right. The method 300 can then proceed to determining whether the keystroke 410D is coincident with an established target (e.g., included in the database provided by the storage 214). As can be appreciated from FIG. 4A, the keystroke 410D can be outside of the established target regions, such that the condition at 308 is not satisfied.

Finding no coincident targets, the method 300 can proceed to determining what the most likely key is, as at 316. Such determining at 316 can proceed according to any suitable disambiguation process or heuristic known in the art. For example, the method 300 can include determining which target associated with the swipe direction D2 of the keystroke 410D is spatially closest to the location of the keystroke 410D. As shown in FIG. 4A, the second target 418 can be the spatially-nearest target that is associated with a swipe direction matching the swipe direction D2 of the keystroke 410D; therefore, the 'W' key 417, associated with the second target 418, can be selected as the most likely key, at 316.

In some implementations, the method 300 can include selecting two or more targets that are spatially nearest to the keystroke 410D and associated with the matching swipe direction and choosing the most likely key among them, for example, based on textual context. For example, the second target 420 associated with the 'E' key 421 and the second target 418 associated with the 'W' key 417 can be the two closest targets associated with the matching swipe direction. Implementing the method 300, the mobile device 100 can consider what text has already been registered, to determine which of the two keys is most likely. For example, if a T and an 'h' have just been entered, it can be considered more likely that the ambiguous key stroke was intended to strike the 'E' key 421 (to spell "the") rather than the 'W' key 417 (resulting in "thw"). The operating system 208 can thus store the most recently selected keys in a buffer (e.g., provided on the storage 218), which the keyboard module 210 can access, so as to consider such historical and/or textual context information. This determination can be adaptive, however, depending on a user's historical textual input, i.e., what words are most frequently used. Thus, the storage 218 can maintain a list of frequently-used words, which the keyboard module 210 can access. Furthermore, knowing the most recently-entered key may provide information as to the direction from which the user's indicator (finger, stylus, etc.) is proceeding, which may affect the probability determination, based on known patterns of keystroke offsets based on point of origin relative certain keys.

Having determined the most likely key at 316, the method 300 can proceed to adjusting one or more targets or adding a new target associated with the most likely key, such that, if the same keystroke 410D is subsequently entered, it can result in a non-ambiguous selection of an input key. For example, FIG. 4B illustrates the second target 418 having been "moved" so as to be coincident with the keystroke 410D. It will be appreciated that such moving can occur using any suitable method, for example, changing variables controlling the position of the second target 418 and/or deleting and initializing a new second target 418 at the new position.

Furthermore, in some implementations, e.g., when the second target 418 is frequently coincident and matching swipe direction as is, before adjustment, the method 300 can include adding a third target, which, in this example, can be associated with the 'W' key 417 and the swipe direction of the keystroke 410D. Such new, third target may also include information about the point of origin of the keystroke 410C, such that, if point of origin determination is found to be deterministic on the location of the keystroke 410C, the third target can be selectively considered based on the user's indicator's point of origin for the keystroke 410C. Having selected a most likely key 108 at 316 and tuned the target(s) associated therewith at 318, the method 300 can proceed to registering the input key as the selected most likely key, as at 314.

In some implementations, the operating system 208 can return to the choice of the most likely key based on subsequent keystrokes 110, in addition to the previously-entered keystrokes 110. Continuing with the example of the ambiguous keystroke 410C between the 'W" key 417 and the 'E' key 421, 'a', 'r', 't' can be the next three letters entered after the ambiguous keystroke 110. Thus, it may be more likely that the keystroke 110 was intended to select the 'W' key 417 (to spell "thwart"), rather than the 'E' Key 421 (resulting in "theart"). The operating system 208 may thus revise the determination and any tuning associated therewith, based on the subsequent keystrokes 110, as part of the textual context consideration.

Returning to FIG. 4A, keystroke 410E provides another illustrative example of an other-than-best-case scenario, which the method 300 converts into a tuning advantage. Returning to the implementation of the method 300 shown in FIG. 3, the method 300 can include registering the keystroke 410E, as at 304, and determining the swipe direction thereof, as at 306, in this case, the up-and-left swipe direction D1. The method 300 can then proceed with the mobile device 100 determining whether any targets are coincident with the keystroke 410E, as at 308. As can be appreciated from FIG. 4A, this condition can be satisfied, since the keystroke 410E can be coincident with a second target 420, associated with the 'E' key 421, as well as the second target 422 associated with the 'R' key 423. Having satisfied the condition at 308, the method 300 can move to 310, determining whether the swipe direction of the keystroke 410E, here, the down-and-right swipe direction D2, matches the coincident targets 420 and 422. In this case, the swipe directions associated with the coincident targets 420 and 422 can be the same and thus both can match the swipe direction D2 of the keystroke 410E.

With the condition at 310 satisfied (i.e., coincident target(s) associated with matching swipe directions found), the method 300 can move to considering whether two or more targets have been identified as both coincident and matching swipe direction, as at 312. Here, two targets have been identified; therefore, the method 300 again proceeds to determining the most likely key, as at 316, e.g., using any suitable disambiguation process or heuristic.

In addition to the disambiguation processes described and/or referenced above, for keystroke 410E, the mobile device 100 can consider which target is coincident with a greater portion of the keystroke 410E. As can be appreciated from the figure (although the figures are not necessarily to be considered drawn to scale), the second target 420 can be characterized as being coincident with a greater portion of the keystroke 410E than is the second target 422. Additionally, more specific directional variables can be employed to distinguish between swipe directions of keystrokes 110 intended for adjacent keys 108. Such information can provide an indication, for example, that for keystroke 410E, that the 'E' key 421 is the more likely intended key 108, as between the 'E' key 421 and the 'R' key 423. This information can be combined with the probability determination from the textual context (or any other disambiguation tactics), so as to result in a selection of the most likely key.

The method 300 can then proceed to adjusting one or both of the second targets 420, 422, so as to tune the target locations and thereby result in a non-ambiguous reading of a subsequent keystroke 110 similar in location and direction to the keystroke 410E. Accordingly, as shown in FIG. 4B, the second target 420, associated with the 'E' key 421, which was determined to be the most likely key, can be moved (as described above) so as to be coincident with the keystroke 410E to a greater degree. If the coincidence of the keystroke 410E with the two second targets 420, 422 was to the same degree, such that other disambiguation tactics were relied upon to arrive at the most likely key, such movement of the second target 420 can result in an additional indication that the subsequent keystroke 110 similar to the keystroke 410E is intended to select the 'E' key 421. In some implementations, the second target 422 associated with the 'R' key 423 can also be moved, such that it is coincident with the keystroke 410E to a lesser degree, for example, not at all. In some cases, however, shifting the position of the target not associated with the most likely key can be avoided. Such avoidance can be desired to avoid shifting targets without an indication of the location of a keystroke that is intended to strike the key associated with the second target 422.

In this or similar ways, the method 300 can provide for interpreting keystrokes 110 using multiple targets for each key 108. Information about both location and swipe direction of the keystrokes 110 can be employed, so as to determine which key 108 is to be selected. Furthermore, the targets can be moved, added, resized, removed, or otherwise adapted to tune the targeting scheme of the keyboard region 104, based on past usage. Accordingly, keystrokes that might otherwise be considered ambiguous, requiring a choice between two keys 108 based on extrinsic information (e.g., textual context, or other probabilities determined from one or more disambiguation tactics), can be non-ambiguously identified based on historical usage, even if, for example, the keystroke 110 slides across or in between two keys 108.

Figure 5:
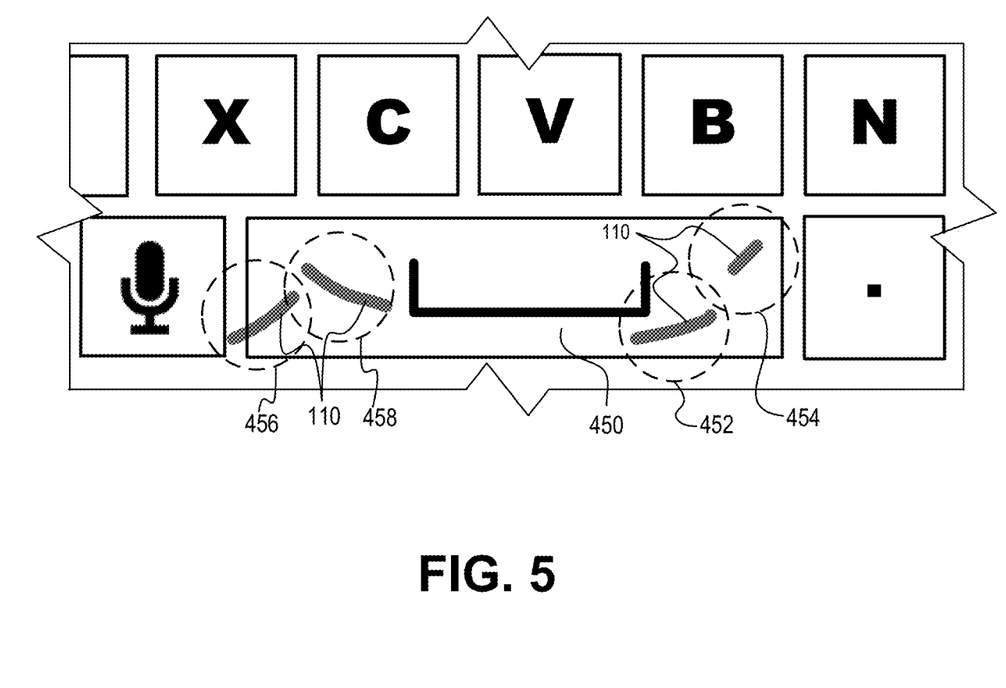
FIG. 5 illustrates an enlarged view of another portion of the keyboard region illustrated in FIG. 1, according to an implementation.

Additionally, it will be appreciated that one or more keys 108 can include more than two targets. One example of this is the space bar 450, illustrated in FIG. 5. Because of the relatively thin, rectangular shape of the spacebar 450 and the nature of common typing practices in general, either side of the spacebar 450 can be targeted by a keystroke 110 at different times. Therefore, the spacebar 150 can include two pairs of targets, for example, targets 452, 454, 456, and 458. The four targets 452-458 can each be associated with a swipe direction, i.e., the targets 452 and 456 can be associated with the same swipe direction, while the targets 454 and 458 are associated with a different swipe direction than that of the targets 452, 456. Accordingly, the keyboard region 104 can be configured to register and interpret keystrokes 110 on either side of the spacebar 450, as shown, or at the middle, corners, etc. Moreover, it will be appreciated that other keys 108 can include multiple pairs of targets. For example, in some keyboard regions 104, the "enter" key can be 'L'-shaped or a thin rectangle and/or the "shift" key can be a thin rectangle as well. Accordingly, such keys 108 can include multiple pairs of targets, so as to register keystrokes aimed at different areas of the key 108.

Figure 6:
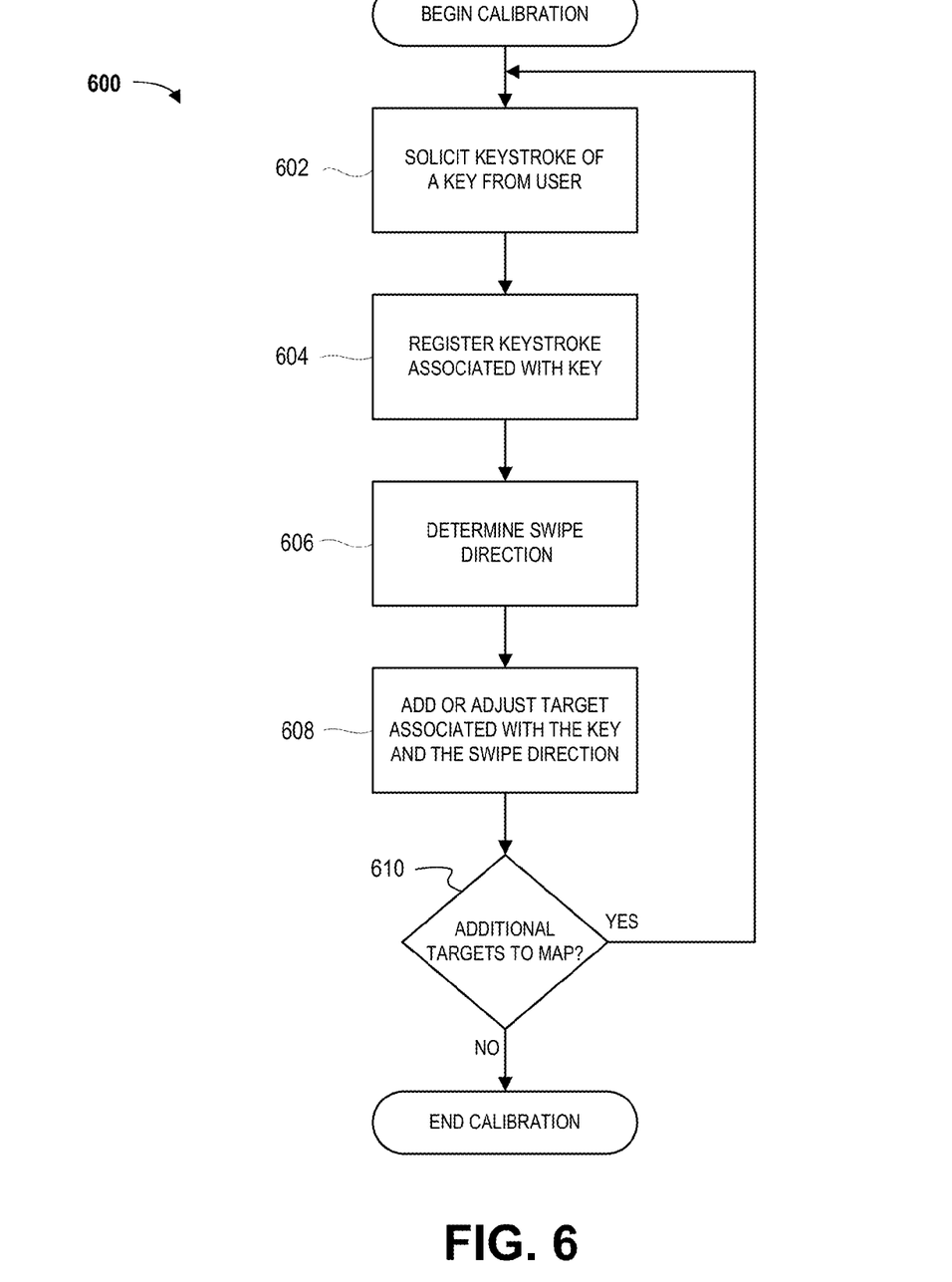
FIG. 6 illustrates a flowchart of a calibration process, which can be employed in the method illustrated in FIG. 3, according to an implementation.

In some circumstances, it can be desirable to provide information for setting the position and/or size of the targets associated with the keys 108, where it is known what keystroke 110 is being entered (i.e., as part of a set-up or calibration process). This can provide additional accuracy and provide a use-based starting point for the targets, such that less tuning can be needed and increased initial accuracy can be realized. Accordingly, FIG. 6 illustrates a flowchart of a calibration process 600, which can be employed with the method 300, for example, as part of associating the first and second targets with the keys 108, as at 302.

The calibration process 600 can begin with a prompt being issued to a user, e.g., via displaying a letter (or another alphanumeric or other symbol associated with a key 108) for the user to strike as an input, as at 602. Such a prompt can be displayed by the display module 202 on the display 102 according to data sent to the display module 202 from the keyboard module 210. Accordingly, the key 108 that the forthcoming keystroke 110 is intended to select can be known, although the best region for the various targets associated with the keys 108 may not.

The process 600 can then proceed to registering the keystroke 110, as described above, which is associated with the displayed, and thus selected, key, as at 604. During, after, or part of such registration at 604, the process 600 can include determining the swipe direction of the keystroke 110, as at 606.

Once the location and the swipe direction of the keystroke 110 are known, the calibration process 600 can proceed to the keyboard module 210 positioning a target associated with the selected key and the swipe direction of the registered keystroke 110 at least partially coincident with the registered keystroke 110, i.e., "tuning" the targeting scheme. Such tuning can proceed by adding one or more new targets and/or adjusting (e.g., moving, resizing, or both) existing targets. Further, such "positioning" can include populating a numerical list of targets with associated location data and/or swipe-direction data.

The process 600 can then proceed to determining whether additional mapping is desired, as at 610. For example, the calibration process 600 can continue in successive iterations until two targets associated with two different swipe directions (e.g., a first target and a second target) is positioned and/or established for each key 108. For example, the process 600 can include the display module 202 displaying different letters in successive iterations and/or specify different hands for the user to use to make the keystrokes 110, until each combination of hand and key is registered and used by the keyboard module 210 to tune the targeting scheme. In other implementations, the calibration process 600 can include the keyboard module 210 determining that sufficient tuning is achieved prior to registering a keystroke 110 for each key 108 and hand combination, e.g., if a suitably large percentage (e.g., substantially all) keystrokes registered are coincident with the appropriate target, such that no or a small amount of tuning can be required.

Figure 7:
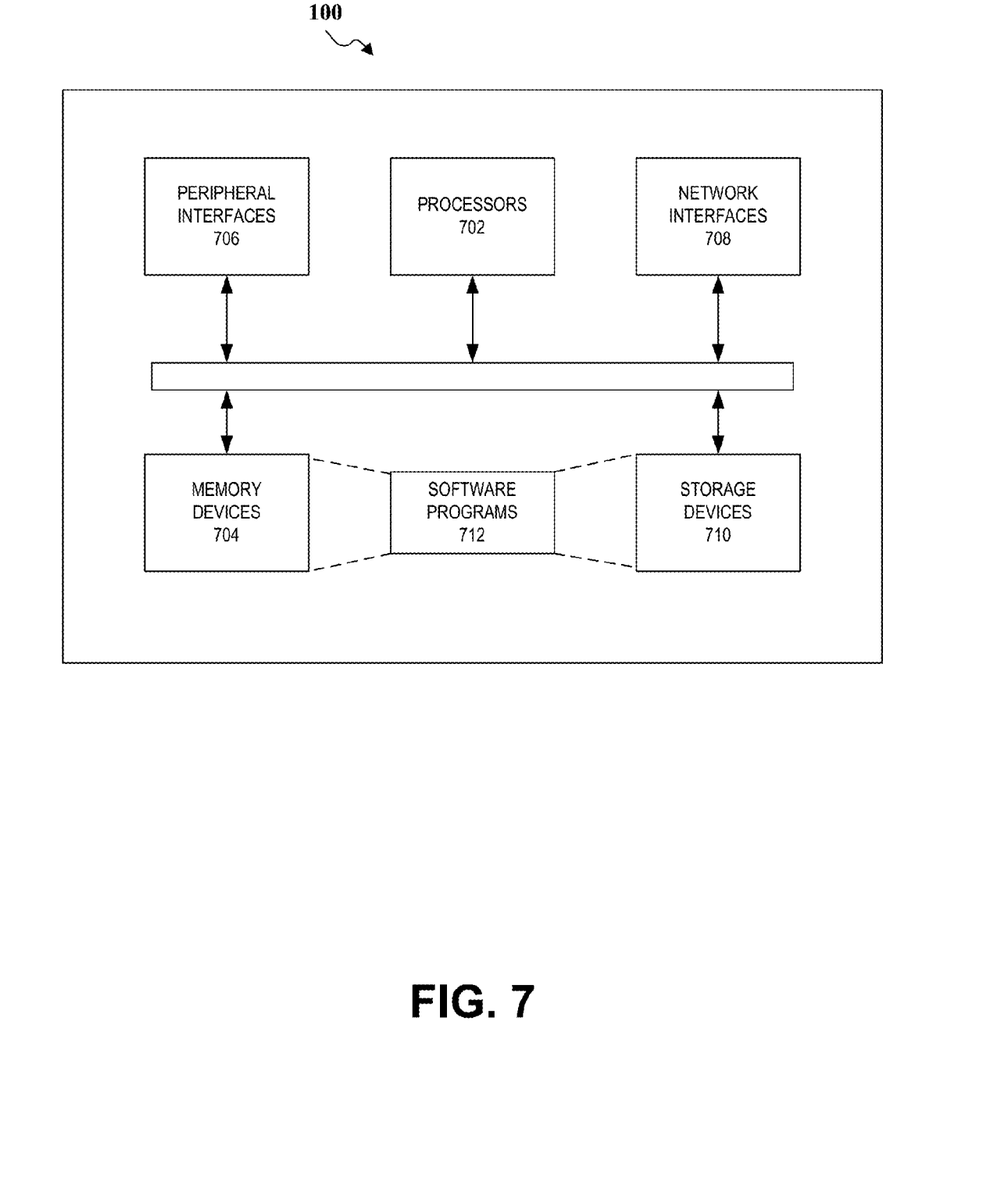
FIG. 7 illustrates another schematic view of components of the mobile device, according to an implementation.

To provide the functionality of the method 300, the operating system 208, applications 216, and modules 202, 210, at least, the mobile device 100 can include computing hardware configured to receive input, store data, execute instructions (e.g., applications), or the like. Accordingly, FIG. 7 illustrates a schematic view of one implementation of such a mobile device 100. The mobile device 100 can include one or more processors 702 of varying core configurations and clock frequencies, which may be configured to implement the operating system 208, keyboard module 210, applications 216, etc., described above with reference to FIG. 6. The mobile device 100 can also include one or more memory devices or computer-readable media 704 of varying physical dimensions and storage capacities, such as flash drives, hard drives, random access memory, etc., for storing data, such as images, files, and program (e.g., application 216) instructions for execution by the processor 702.

The mobile device 100 can also include one or more network interfaces 706. The network interface 706 can also include any hardware and/or applications or other software, such that the network interface 706 can also be configured to receive signals from remote sources. Accordingly, the network interface 706 can include Ethernet adapters, wireless transceivers, or serial network components, for communicating over wired or wireless media using protocols, such as Ethernet, wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc.

The mobile device 100 can further include one or more peripheral interfaces 708, such as the display module 602, which as discussed above. Further, the peripheral interface 708 can include various other keyboards, mice, touchpads, computer screens, touchscreens, etc., for enabling human interaction with and manipulation of the mobile device 100. In some implementations, the components of the mobile device 100 need not be enclosed within a single enclosure or even located in close proximity to one another, but in other implementations, the components and/or others can be provided in a single enclosure.

The memory devices 704 can further be physically or logically arranged or configured to provide for or store data on one or more storage devices 710, which can include the storage 218. The storage devices 710 can include one or more file systems or databases, and one or more software programs 712, which can contain interpretable or executable instructions for performing one or more of the disclosed implementations. Those skilled in the art will appreciate that the above-described componentry is merely one example of a hardware configuration, as the mobile device 100 can include any type of hardware components, including any necessary accompanying firmware or software, for performing the disclosed implementations. The mobile device 100 can also be implemented in part or in whole by electronic circuit components or processors, such as application-specific integrated circuits (ASICs) or field-programmable gate arrays (FPGAs).

The foregoing description of the present disclosure, along with its associated implementations, has been presented for purposes of illustration only. It is not exhaustive and does not limit the present disclosure to the precise form disclosed. Those skilled in the art will appreciate from the foregoing description that modifications and variations are possible in light of the above teachings or can be acquired from practicing the disclosed implementations.

For example, the same techniques described herein with reference to the mobile device 100 can be used to execute programs according to instructions received from another program or from another computing system altogether. Similarly, commands can be received, executed, and their output returned entirely within the processing and/or memory of mobile device 100. Accordingly, neither a visual interface command terminal nor any terminal at all is strictly necessary for performing the described implementations.

Likewise, the steps described need not be performed in the same sequence discussed or with the same degree of separation. Various steps can be omitted, repeated, combined, or divided, as necessary to achieve the same or similar objectives or enhancements. Accordingly, the present disclosure is not limited to the above-described implementations, but instead is defined by the appended claims in light of their full scope of equivalents.

In the above description and in the below claims, unless specified otherwise, the term "execute" and its variants are to be interpreted as pertaining to any operation of program code or instructions on a device, whether compiled, interpreted, or run using other techniques. Also, in the claims, unless specified otherwise, the term "function" is to be interpreted as synonymous with "method," and can include methods within program code, whether static or dynamic, and whether they return a value or not. The term "function" has been used in the claims solely to avoid ambiguity or conflict with the term "method," the latter of which can be used to indicate the subject matter class of particular claims.

What is claimed is:

1. A method for selecting an input key from a keystroke, comprising:
    displaying a keyboard comprising keys;
    defining targets on the keyboard, wherein each one of the targets is associated with one of the keys, an area of the keyboard, and a swipe direction, and wherein each one of the keys is associated with at least two of the targets;
    determining a location and a swipe direction of the keystroke relative to the keyboard;
    comparing the location of the keystroke with the areas associated with at least some of the targets;
    comparing the swipe direction of the keystroke with the swipe directions associated at least some of the targets; and
    defining the input key based on the comparisons of the location of the keystroke and the swipe direction of the keystroke with the targets.

2. The method of claim 1, wherein defining the input key based on the comparisons of the location of the keystroke and the swipe direction of the keystroke with the targets comprises:
    determining that the area associated with one of the targets is coincident with at least a portion of the keystroke;
    determining that the swipe direction associated with the one of the targets matches the swipe direction of the keystroke; and
    selecting the one of the keys associated with the one of the targets as the input key.

3. The method of claim 1, wherein defining the input key based on the comparisons of the location of the keystroke and the swipe direction of the keystroke with the targets comprises:
    determining that the keystroke is at least partially coincident with the area associated with one of the targets;
    determining that the swipe direction of the keystroke mismatches the swipe direction associated with the one of the targets; and
    disregarding the one of the targets.

4. The method of claim 1, wherein defining the input key based on the comparisons of the location of the keystroke and the swipe direction of the keystroke with the targets comprises:
    determining that none of the targets are both associated with an area that is coincident with the keystroke and associated with a swipe direction matching the swipe direction of the keystroke;
    inferring a most likely key as the input key; and
    adjusting one of the targets associated with the most likely key, such that the one of the targets is at least partially coincident with the keystroke and the swipe direction associated with the one of the targets matches the swipe direction of the keystroke.

5. The method of claim 4, wherein inferring the most likely key comprises:
    determining a spatially-nearest one of the targets having the swipe direction associated therewith matching the swipe direction of the keystroke; and
    choosing the key associated with the spatially-nearest one of the targets as the most likely key.

6. The method of claim 4, wherein inferring the most likely key comprises:
    determining at least two spatially-nearest targets having the swipe directions associated therewith that match the swipe direction of the keystroke; and
    choosing the most likely key from among the keys associated with the at least two spatially-nearest targets based at least on textual context.

7. The method of claim 6, further comprising adjusting the area associated with the one of the at least two spatially-nearest targets that is associated with the most likely key, such that the adjusted area is at least partially coincident with the keystroke.

8. The method of claim 4, further comprising adding a new target associated with the most likely key, the new target being associated with an area that is at least partially coincident with the keystroke and being associated with a swipe direction that matches the swipe direction of the keystroke.

9. The method of claim 1, wherein defining the input key based on the comparisons of the location of the keystroke and the swipe direction of the keystroke with the targets comprises:
    determining that the keystroke is at least partially coincident with the area associated with a first one of the targets and the area of a second one of the targets, wherein the first one of the targets and the second one of the targets are associated with different keys;
    determining that the swipe direction of the keystroke matches the swipe direction associated with the first one of the targets and matches the swipe direction associated with the second one of the targets;
    inferring a most likely key from between the key associated with the first one of the targets and the key associated with the second one of the targets; and
    choosing the most likely key as the input key.

10. The method of claim 9, wherein inferring the most likely key comprises choosing between the key associated with the first one of the targets and the key associated with the second one of the targets based on whether the area associated with the first one of the targets is coincident with the keystroke to a greater or lesser degree than the degree to which the keystroke is coincident with the area associated with the second one of the targets, or based on a textual context, or both.

11. The method of claim 10, further comprising:
choosing the first one of the keys as the most likely key; and
adjusting the area associated with the first one of the targets, such that the adjusted area coincides with the keystroke to a greater degree.

12. The method of claim 1, further comprising calibrating the keyboard, comprising:
soliciting a calibration keystroke of a key;
registering a location and a swipe direction of the calibration keystroke; and
adding a new target associated with the key, the new target being associated with a swipe direction matching the swipe direction of the calibration keystroke and an area of the keyboard at least partially coincident with the location of the calibration keystroke.

13. A computer-implemented method for interpreting keystrokes on a virtual keyboard, comprising:
associating targets with keys of keyboard, wherein each target is associated with one of the keys, and wherein each one of the keys has at least two of the targets associated therewith;
positioning the targets on the keyboard, such that each target is associated with an area of the keyboard;
associating each of the targets with a swipe direction;
determining a location of the keystroke and a swipe direction of the keystroke relative the keyboard; and
comparing the location of the keystroke and the swipe direction of the keystroke with the areas and the swipe directions associated with at least some of the targets.

14. The method of claim 13, further comprising:
determining that the keystroke is ambiguous;
inferring a most likely key intended to be selected by the keystroke; and
adjusting the area, swipe direction, or both associated with at least one target associated with the most likely key, such that the keystroke, if repeated, is no longer ambiguous.

15. The method of claim 14, wherein determining that the keystroke is ambiguous comprises determining that zero or two or more targets are associated with an area of the keyboard that is at least partially coincident with the keystroke and are associated with a swipe direction matching the swipe direction of the keystroke.

16. The method of claim 14, wherein inferring the most likely key comprises:
selecting at least two keys having targets associated with areas that are spatially-nearest the location of the keystroke; and
comparing the at least two keys with a textual context.

17. A non-transitory computer-readable medium storing instructions that, when executed by one or more processors, cause the one or more processors to perform a sequence of operations comprising:
displaying a keyboard comprising keys;
defining targets on the keyboard, wherein each one of the targets is associated with one of the keys, an area of the keyboard, and a swipe direction, and wherein each one of the keys is associated with at least two of the targets;
determining a location and a swipe direction of the keystroke relative to the keyboard;
comparing the location of the keystroke with the areas associated with at least some of the targets;
comparing the swipe direction of the keystroke with the swipe directions associated with at least some of the targets; and
defining the input key based on the comparisons of the location of the keystroke and the swipe direction of the keystroke with the targets.

18. The non-transitory computer-readable medium of claim 17, wherein defining the input key comprises:
determining that the area associated with one of the targets is coincident with at least a portion of the keystroke;
determining that the swipe direction associated with the one of the targets matches the swipe direction of the keystroke; and
selecting the one of the keys associated with the one of the targets as the input key.

19. The non-transitory computer-readable medium of claim 17, wherein defining the input key comprises:
determining that the keystroke is partially coincident with the area associated with a first one of the targets and the area of a second one of the targets, wherein the first one of the targets and the second one of the targets are associated with different keys;
determining that the swipe direction of the keystroke matches the swipe direction associated with the first one of the targets and matches the swipe direction associated with the second one of the targets;
inferring that the key associated with the first one of the targets is a most likely key;
choosing the most likely key as the input key; and
adjusting the area associated with the first one of the targets, such that the area of the first one of the targets is coincident with the keystroke to a greater degree.

20. The non-transitory computer-readable medium of claim 17, wherein the sequence of operations further comprises calibrating the keyboard, comprising:
soliciting a calibration keystroke of a key;
registering a location and a swipe direction of the calibration keystroke; and
adding a new target associated with the key, the new target being associated with the swipe direction of the calibration keystroke and located at least partially coincident with the location of the calibration keystroke.

* * * * *